Jan. 13, 1942.     M. A. MILLS     2,269,728
VEHICLE CONSTRUCTION
Filed Aug. 22, 1939     6 Sheets-Sheet 5
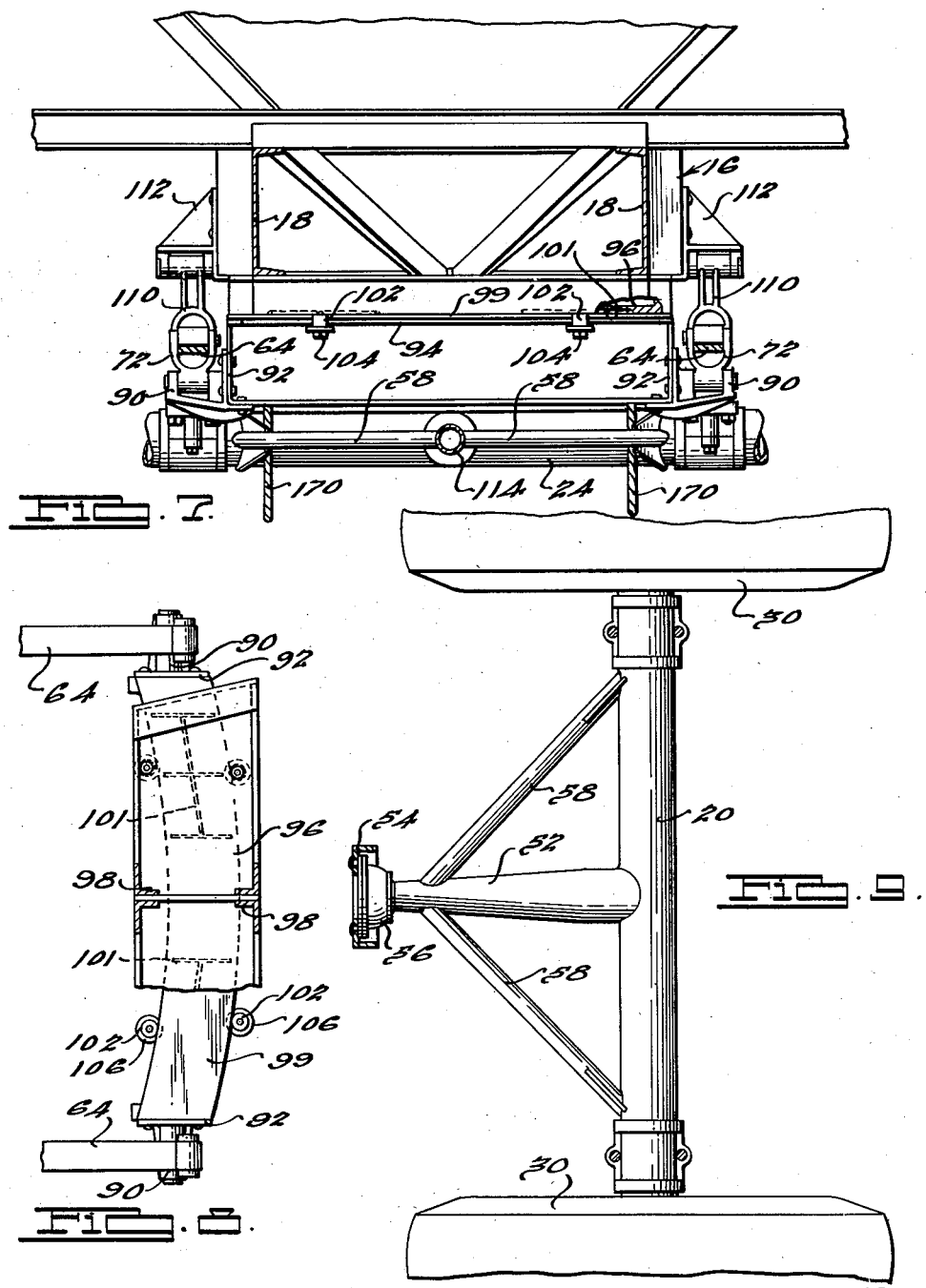
INVENTOR
Maurice A. Mills.
BY
Harness, Dickey & Pierce
ATTORNEYS.

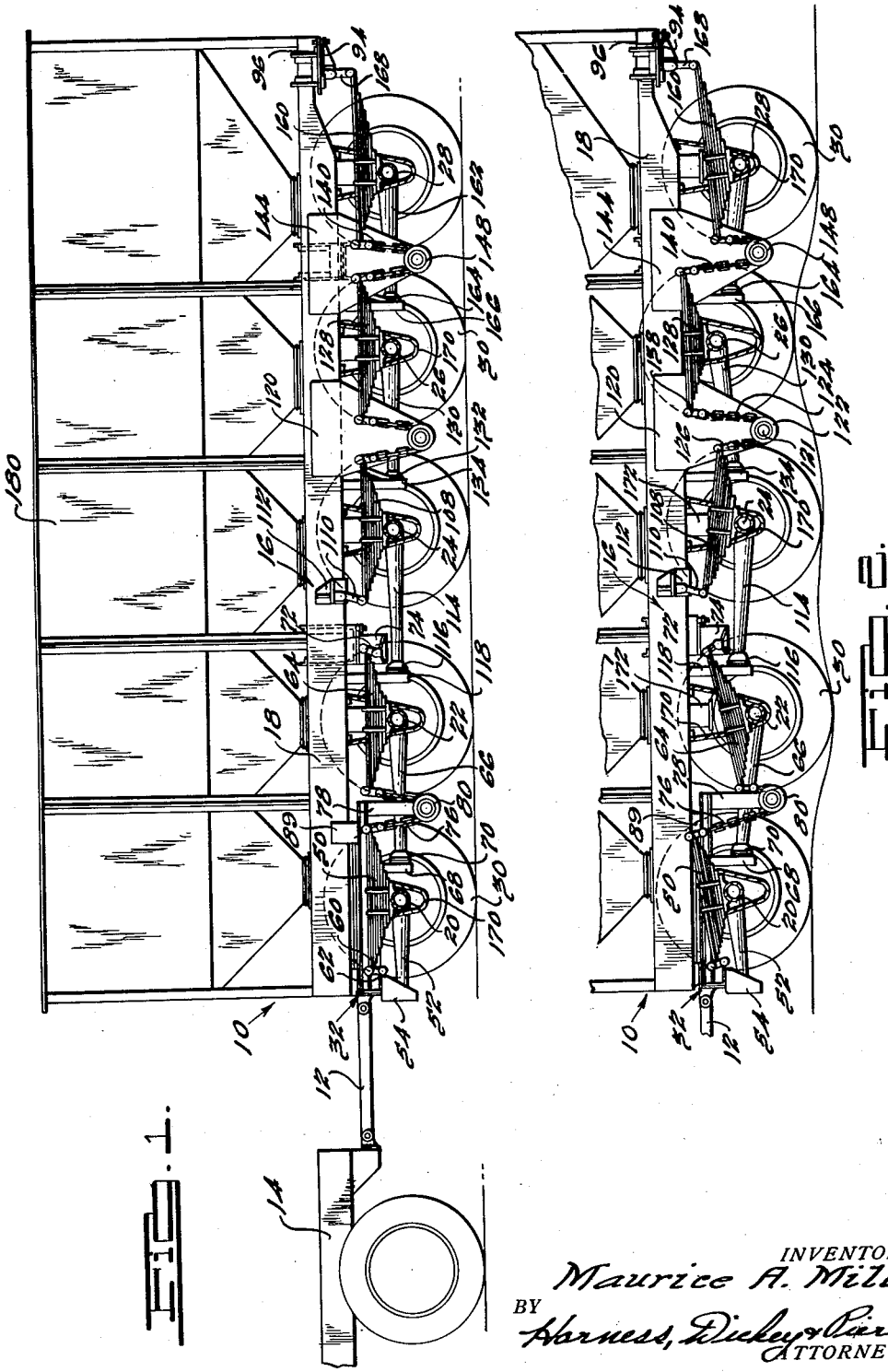

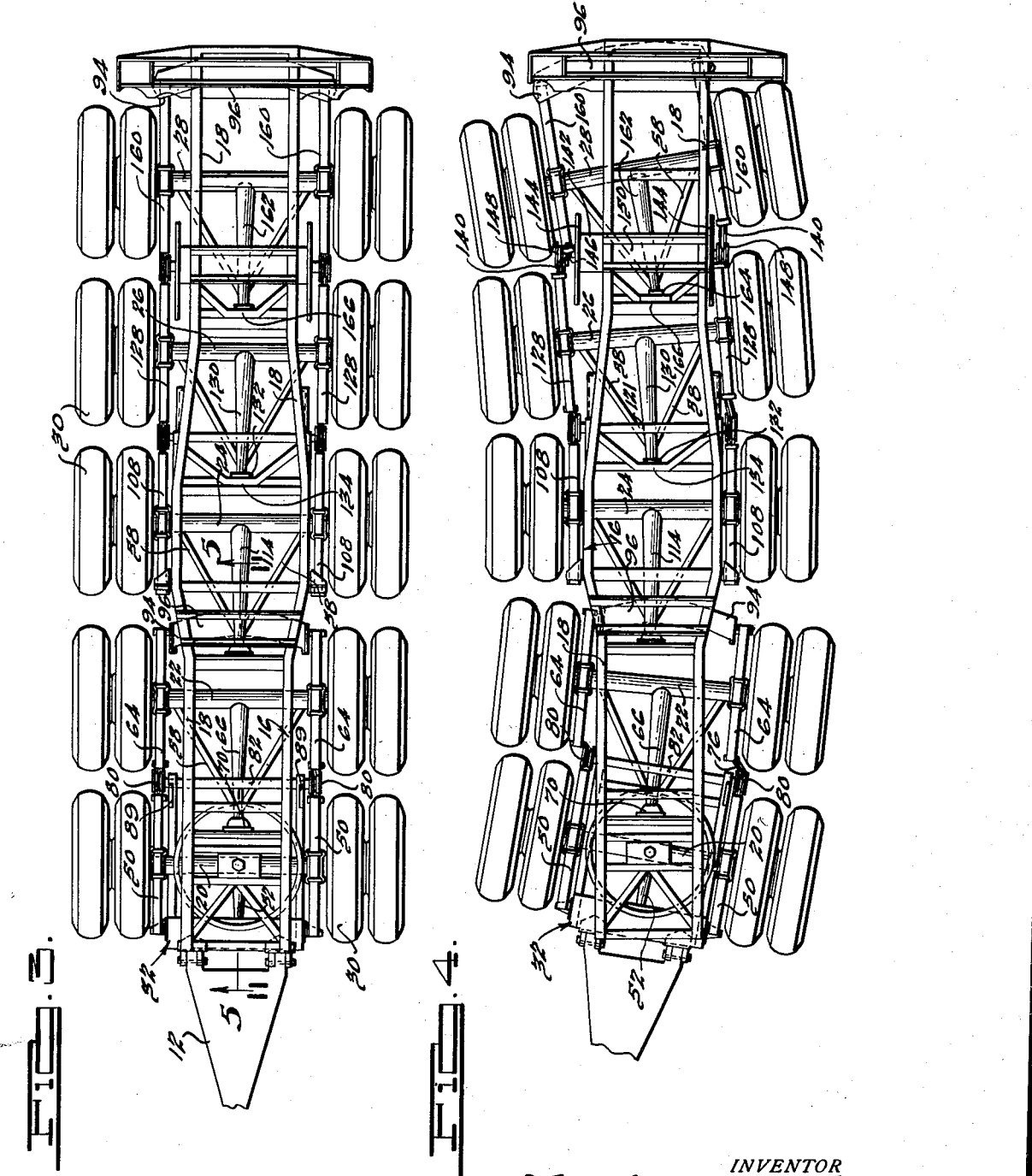

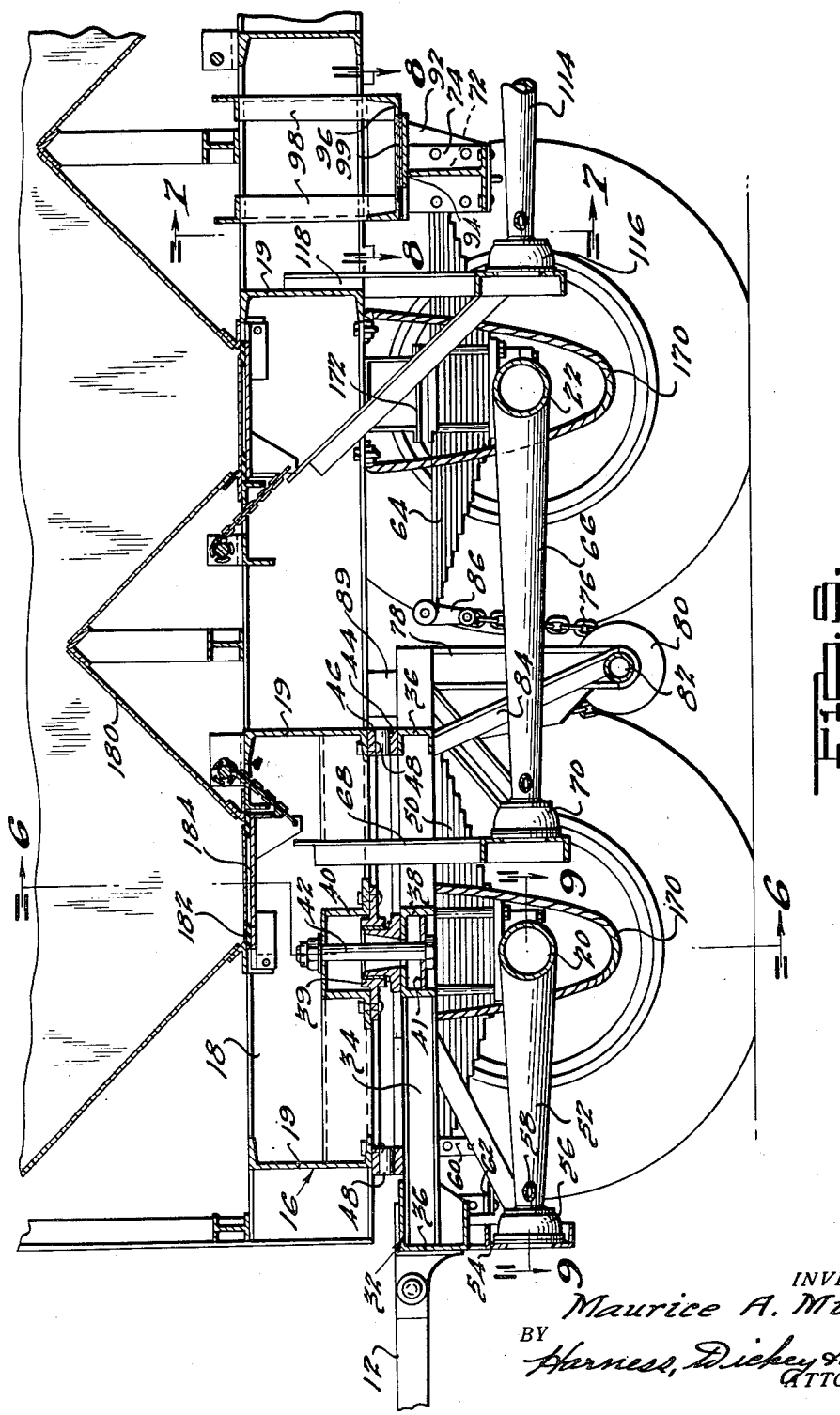

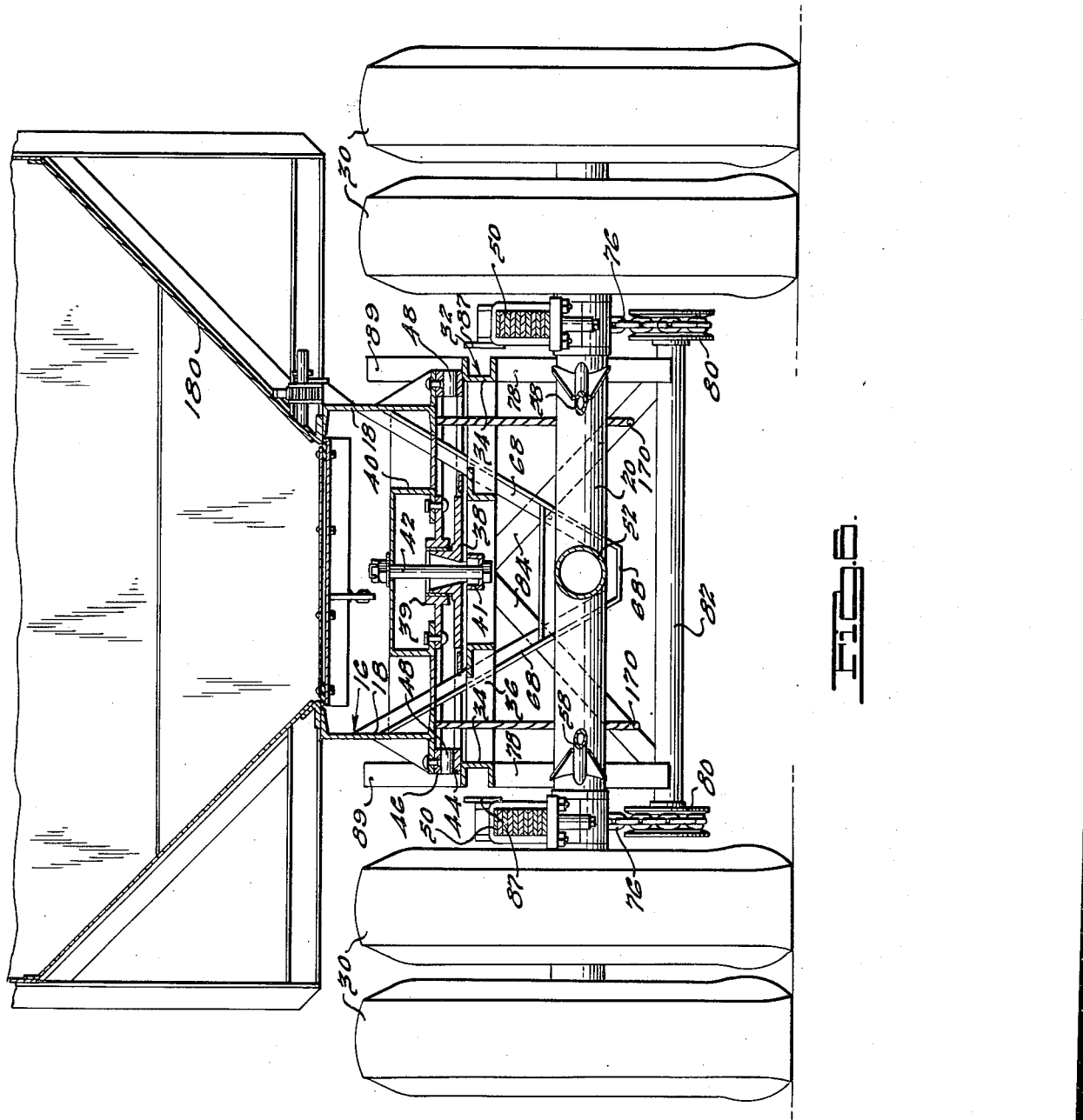

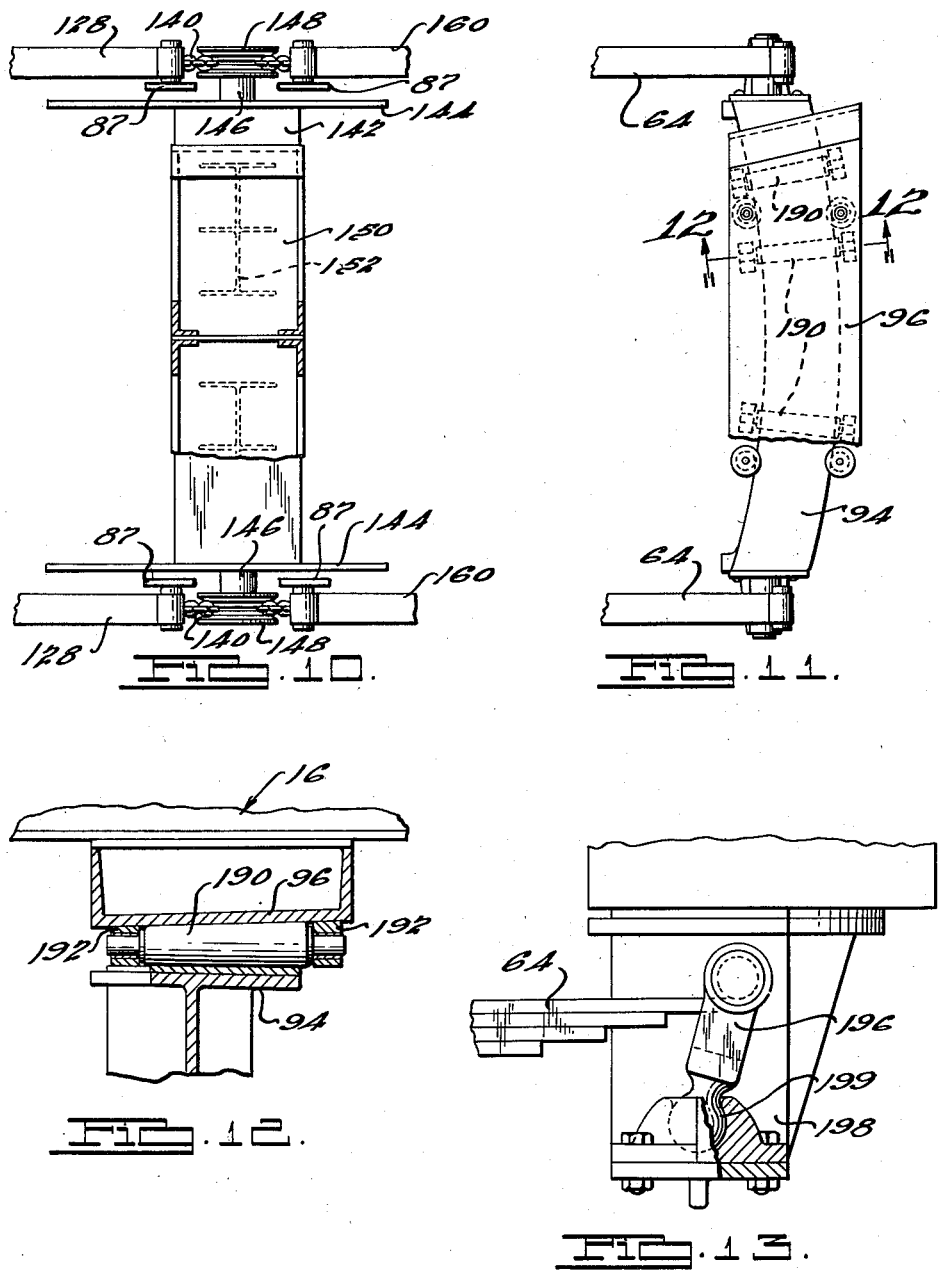

Patented Jan. 13, 1942

2,269,728

UNITED STATES PATENT OFFICE 2,269,728

VEHICLE CONSTRUCTION

Maurice A. Mills, Dearborn, Mich., assignor to Fred M. Ward, Jr., Oxford, Mich.

Application August 22, 1939, Serial No. 291,383

13 Claims. (Cl. 280—124)

The present invention relates to vehicle constructions and particularly relates to improvements in vehicle trailer constructions.

One of the primary objects of the present invention is to provide an improved vehicle construction whereby the percentage of pay load weight of the loaded vehicle may be materially increased.

Another object of the invention is to provide an improved trailer construction capable of carrying exceptionally heavy loads in which the total load is distributed over a considerable area of roadway through a plurality of axles in which the axle load is within the limit allowed by law.

Another object of the invention is to provide an improved trailer construction capable of carrying heavy loads which may be readily maneuvered in traffic on the highways, thereby decreasing the time required to make a haul of a given distance and, consequently, increasing the load which may be carried by a given vehicle in a given time.

Another object of the invention is to provide a trailer vehicle having a plurality of wheel axles in which the axles are so mounted as to permit the turning of the vehicle on a comparatively small radius.

Another object of the invention is to provide an improved manner of mounting a plurality of wheel axles in tandem, whereby each axle is effective to support its share of load irrespective, substantially, of the configuration of the road surface over which the vehicle is passed.

Another object of the invention is to provide an improved manner of mounting a plurality of wheel axles in tandem in which the axles may be placed relatively close together.

Another object of the invention is to provide an improved manner of mounting a plurality of wheel axles in tandem in which suspension means for the axles are so constructed and arranged that the load and road shocks are properly divided on the axles while at the same time the axles are free to swing and tilt without undue restriction.

Another important object of the invention is to provide a suspension means for a wheel axle, which is free to float, behind a pivot frame which may have an axle attached thereto for pivotal movement with the frame.

Another object of the invention is to provide an improved suspension means for a plurality of vehicle axles which includes a chain connection, by the use of which the radius member about which the chain is trained may be of relatively small radius.

Other objects of the invention will become apparent from the following specification, the drawings relating thereto, and from the claims hereinafter set forth.

In the drawings, in which like numerals are used to designate like parts in the several views throughout:

Figure 1 is a side elevational view of a trailer construction embodying features of the present invention;

Fig. 2 is a partial view similar to Fig. 1, illustrating the position of the wheel suspension elements when the vehicle is traversing an irregular road surface;

Fig. 3 is a top plan view of the vehicle chassis of the structure shown in Fig. 1;

Fig. 4 is a view similar to Fig. 3, illustrating the wheels and axles in turning position;

Fig. 5 is an enlarged, fragmentary cross-sectional view taken substantially along the line 5—5 of Fig. 3;

Fig. 6 is a cross-sectional view taken substantially along the line 6—6 of Fig. 5;

Fig. 7 is a cross-sectional view taken substantially along the line 7—7 of Fig. 5;

Fig. 8 is a plan and cross-sectional view taken substantially along the line 8—8 of Fig. 5;

Fig. 9 is a plan and cross-sectional view taken substantially along the line 9—9 of Fig. 5;

Fig. 10 is a view similar to Fig. 8, showing a slide plate mounting for the next to the last axle of the vehicle construction;

Fig. 11 is a view similar to Fig. 8, illustrating a modified form of slide plate construction;

Fig. 12 is an enlarged cross-sectional view taken substantially along the line 12—12 of Fig. 11; and Fig. 13 is a side elevational view with parts broken away showing parts in cross-section of a modified form of shackle connection.

Referring to the drawings, and referring particularly to Figs. 1 to 10 thereof, an embodiment of applicant's invention is illustrated which includes a trailer generally indicated at 10 connected through a suitable linkage member 12 to the rear end of a tractor 14. The trailer 10 includes a vehicle frame generally indicated at 16, which includes longitudinally extending side frame members 18 connected together by transversely extending frame members 19 at spaced points therealong to provide a rigid frame construction. Suitable bracing struts may also be provided on the frame to further strengthen and rigidify it. The frame 16 is slightly wider adjacent the central portion thereof than at the ends so as to permit turning of the axles without interference.

A plurality of axles 20, 22, 24, 26 and 28 are disposed under the frame 16 at substantially equal spaces therealong from the front to the rear thereof. Each of the axles has ground engaging wheels 30 mounted on the ends thereof in the usual way, there being a pair of such ground engaging wheels at each end of each axle in the embodiment illustrated.

The axle 20 is the steering axle and is disposed adjacent the forward end of frame 16. It is mounted on a steering frame generally indicated at 32 which, in turn, is pivotally mounted to the vehicle frame 16. The details of the steering frame 32 and the manner in which it is mounted to the vehicle frame 16 are best shown in Figs. 5 and 6. The frame 32 includes longitudinal and transverse frame members 34 and 36, respectively, formed into a generally rectangular, rigid open work frame. The frame 32 has a central hub structure 38 which is adapted to be disposed under a cooperating hub structure 39 fixed to frame 16 adjacent the forward end thereof by means of housing structure 40. A tie bolt 42 is adapted to extend through the hub structures 38 and 40 and be connected thereto through connection with the housing 40 and a plate member 41, which is fixed to the hub structure 38. The frame 32 is thereby pivotally mounted relative to the vehicle frame 16 through the hub structures and cannot separate therefrom because of the construction and arrangement of the tie bolt.

A supporting friction ring 44 is fixed to the top of framework 32; and a cooperating, complementary, friction ring 46 is fixed to the under surface of frame 16 above ring 44. Rollers 48 are positioned between rings 44 and 46 so that the forward end of frame 16 is supported on the frame 32 through the rings 44 and 46 having the rollers 48 interposed therebetween. The rollers 48 may be mounted in a suitable cage or otherwise fixed against displacement.

Suspension means for mounting the frame 32, and therefore the forward end of frame 16, on axle 20 are provided which include longitudinally extending beam members in the form of leaf springs 50 at each side of the vehicle frame. The leaf springs 50 are attached to the axle 20 intermediate the ends of the leaf springs in the usual way.

A longitudinally extending radius member 52 in the form of a tube has its rear ends rigidly connected to axle 20 at substantially the transverse center thereof and has its forward end universally connected to a depending bracket 54 which is rigidly mounted on the forward end of frame 32. The universal connection between the forward end of radius member 52 and bracket 54 is effected through a ball and socket construction indicated at 56. Rigid bracing members 58 have their forward ends rigidly attached to the forward end of tube 52 and diverge, having their rear ends rigidly connected to axle 20.

The forward ends of beams 50 are pivotally attached to the upper ends of shackles 60 which have the lower ends pivotally attached to brackets 62 mounted on frame 32. The mounting for the rear ends of beams 50 will be described in detail hereinafter, it being pointed out now that the mounting for the axle 20 relative to the frame 32 is such that the axle 20 is free to move up and down relative to the frame but is fixed against pivotal movement relative thereto so that the axle 20 turns with the steering frame 32.

The mounting for axle 22 includes longitudinally extending beams 64, in the form of leaf springs, at each side of the vehicle frame; and the leaf springs 64 are secured to axle 22 intermediate the ends of the leaf springs in the usual way.

A longitudinally extending radius member 66 in the form of a tube has the rear end thereof rigidly attached to axle 22 at substantially the transverse center thereof and has the forward end universally connected to a depending bracket 68 which is rigidly secured to vehicle frame 16. The universal connection is provided through a ball and socket connection 70 similar to the connection 56. The bracket 68 is disposed immediately behind axle 20 and extends down through the framework of the steering frame 32, the construction and arrangement of the bracket and framework relative to each other being such that the framework 32 may be turned relative to the frame 16 without interference by the bracket 68.

The forward ends of beams 64 are connected to the rear, adjacent ends of the beams 50 on the respective sides of the vehicle through flexible chain connections including chains 76. A depending mounting bracket 78 is rigidly fixed to the rear end of steering frame 32 at each side thereof; and each bracket 78 has a pulley 80 pivotally mounted thereon adjacent the lower end thereof. The pulleys 80 may be pivotally mounted on the ends of a transverse shaft 82 which connects the brackets 78. Bracing struts 84 may be fixed to the rod 82 and to the frame 32 for bracing the construction if desired.

A chain 76 is trained around each of the pulleys 80 and has one of its upper ends pivotally connected to the forward end of beam 64 through a link 86; and has its other end pivotally connected to the rear end of beam 50 through a similar link. By this construction, the forward end of each beam 64 is flexibly connected to the rear end of each of its corresponding beams 50 at each side of the frame.

The shackle bolts connected to the rear ends of beams 50 each have stop discs 87 welded to the inner ends thereof which are adapted to abut against stop surfaces on upstanding plate members 89. Such plate members 89 are fixed to the top surface of members 34 adjacent the rear ends of beams 50 and the outer surfaces of members 89 are substantially flush with the outer edges of members 34. The members 89 are of sufficient area so that stops 87 rub thereagainst and limit lateral movement of the free ends of beams 50 and prevent such ends from riding over beams 34.

As the steering frame 32 is turned, the mounting bracket 78 with the pulleys 80 turns therewith and beams 50 also turn with the frame 32 so that the axle 20 is thereby fixed against pivotal movement relative to frame 32.

Axle 22 is free to float, that is, tilt and turn, relative to frame 16 and to axle 20 and such is effected through the chain connection just described for the forward ends of beam 64 and a transverse slide plate construction for the rear ends of beam 64, now to be described. This slide plate construction is best shown in Figs. 5, 7, and 8. The rear end of each of beams 64 is pivotally connected to the upper end of a shackle 72. The lower end of shackle 72 is pivotally mounted to an outboard bracket 90 which is fixedly secured to depending end plates 92 on a transverse slide plate 94. The slide plate 94 is arcuate in shape, the side edges thereof being struck about a radius having its center at the turning point of the ball and socket connection 70. The slide plate 94 bears against the under surface of a transverse bearing plate 96 which is fixed to vehicle frame 16 by means of mounting members 98. The bearing plate 96 is preferably straight and wider than the slide plate 94 so that the slide plate 94 will bear thereagainst for all of its turned positions. A strip of bearing material 99 may be interposed between the bearing surfaces of slide plate 94 and bearing 96 so as to reduce the friction therebetween. The bearing plate 96 is preferably provided with grooves 101 on the under surface thereof for the reception of suitable lubricant so that the surfaces are lubricated as the plates slide relative to each other.

Since the rear ends of beams 64 are fixed relative to the transverse slide plate 94; and since the forward ends of the beams are connected through the chain mechanism to the rear ends of beams 50, it will be evident that axle 22 may tilt and turn relative to axle 20 and relative to vehicle frame 16.

In order to maintain alignment between slide plate 94 and bearing plate 96, depending rollers 102 may be pivotally mounted to bearing plate 96 by means of pivot pins 104. The rollers 102 bear against the side edges of slide plate 94 so as to guide the slide plate during its sliding movement. Rings 106, of diameters larger than rollers 102, may be mounted on the lower ends of pins 104 and engage under the slide plate 94 so that slide plate 94 and plate 96 do not separate from each other.

The construction just described of the mounting means for axles 20 and 22 is important in that by this construction the turning of the vehicle is facilitated. As the frame 32 is turned, the axle 20 turns therewith, and the wheels on axle 22 track after the wheels on axle 20. The wheels on axle 22 do not skid or slide when turning, because, due to the lateral movement of the slide plate, the wheels on axle 22 follow the radius of turn as set by the turning of frame 32.

Axles 24, 26, and 28 may be considered as a group of three axles in which axle 24 is mounted so that it is fixed against pivotal movement relative to the vehicle frame 16, and the axles 26 and 28 are mounted so that they may tilt and transversely swing relative to the vehicle frame and to axle 24.

Longitudinally extending beams 108 in the form of leaf springs are mounted intermediate their ends in the usual way to axle 24. The forward ends of beams 108 are pivotally connected to the lower ends of shackles 110 which have the upper ends thereof pivotally attached to brackets 112 fixed to the longitudinal members 18 of the frame 16. A longitudinally extending radius member 114, similar to radius member 66, has the rear end thereof fixed to the axle 24 substantially at the transverse center and has its forward end universally connected through a ball and socket connection 116 to the lower end of a depending bracket 118. The bracket 118 is fixed to the vehicle frame 16 immediately behind axle 22.

A depending bracket 120 is fixed to the side members 18 of vehicle frame 16 at each side thereof and extends downwardly between axles 24 and 26. A transversely extending shaft 121 is mounted through the lower ends of members 120, and the shaft 121 has pulleys 122 mounted on the outer ends thereof.

A chain 124 is adapted to be trained around each pulley 122 and has one end thereof pivotally connected through link 126 with the rear end of each beam 108. The manner in which the other ends of the chain 124 are connected will be described hereinafter.

Axle 26 has a longitudinally extending beam 128 at each side thereof, such beam being in the form of leaf springs which are connected intermediate their ends to the axle 26 in the usual way. A longitudinally extending radius member 130, similar to members 66 and 114, has the rear end thereof fixed to the axle 26 at substantially its transverse center and has its forward end universally connected through a ball and socket joint 132 to a depending bracket 134. The bracket 134 is similar to bracket 118 and is fixed to the vehicle frame 16 immediately behind axle 24.

The forward ends of beams 128 are connected to the rear ends of corresponding beams 108 through chains 124, in that the end of chain 124, above mentioned, is pivotally connected through link 138 with the forward end of beams 128.

The rear ends of beams 128 are connected to a transverse slide plate through chains 140, so that the axle 26 may swing transversely relative to the vehicle frame. The slide plate for axle 26 is generally similar to the slide plate described in connection with axle 22, but instead of being arcuate in shape, both the slide plate and the bearing plate of the frame are substantially straight. The slide plate construction includes a transversely extending slide plate 142 having depending brackets 144 fixed to the ends thereof. The brackets 144 have stub shafts 146 fixed to the lower ends thereof upon which pulleys 148 are rotatably mounted. The transverse slide plate 142 is adapted to bear against a bearing plate 150 which is fixed to the under side of the vehicle frame 16. Plate 150 is provided with lubricating grooves 152 therein, and a strip of bearing material may be interposed between slide plate 142 and bearing plate 150 similar to strip 99 in the slide construction for axle 22.

Axle 28 has longitudinally extending beam members 160 attached thereto intermediate the ends of the beam members at each side of the vehicle frame. A longitudinally extending radius member 162, similar to the radius members 66, 114, and 130, previously described, has its rear end fixed to axle 20 at substantially the transverse center of the axle and has its forward end universally connected, through a ball and socket connection 164, with a depending bracket 166. The bracket 166 is similar to brackets 118 and 134 above described, is fixed to the vehicle frame 16, and extends downwardly therefrom immediately behind axle 26.

The front end of each beam 160 is connected to the rear end of chain 140 which is trained about the pulley 148 at each side of the frame.

The rear end of each beam 160 is pivotally connected to the lower end of a shackle 168 which is mounted on a transverse slide plate construction similar to that used in connection with axle 22 and illustrated in Figs. 7 and 8. The same reference numerals 94 and 96 are used to designate the slide plate and bearing plate, respectively, as are used in connection with the similar construction shown in Figs. 7 and 8, because the construction is substantially the same.

From the above description it will be seen that the axles are all free to move vertically relative to each other and also that they may be turned relative to each other. The trailer is steered through turning the steering frame 32, and when such frame is turned the axle 20 turns therewith. The wheels on axle 22 track after the wheels on axle 20, and as axle 24 cannot pivot relative to the frame, the wheels on axle 24 serves as the turning center for the trailer. Axles 26 and 28 are free to swing transversely relative to the vehicle frame 16, and the wheels on these axles will track after the wheels on axle 24.

In order to limit the downward movement of the axles, slings, in the form of flexible cables 170, are slung around each of the axles at each side of the vehicle frame, so that in the event the axles drop a predetermined amount they abut against the cables 170. The cables for axles 22, 24, 26, and 28 may be attached directly to the vehicle frame 16 while the cables for axle 20 may be attached to the steering frame 32.

In order to limit the upward movement of the axles, bumpers 172 are disposed above the axles at substantially the transverse center of the frame. Such bumpers may include depending side plates having a bottom plate thereon in which the side plates may be attached directly to the vehicle frame 16. It will thus be seen that the vertical movement of the axles is limited by the cables 170 and bumpers 172.

By the mounting for the radius members 66, 114, 130, and 162 to the depending bracket position so that the depending bracket for a corresponding radius member is positioned between the adjacent axles and immediately behind the axle adjacent the axle to which the corresponding radius rod is attached, the turning radius for each axle is comparatively short so that the turning of the vehicle may be effected in a comparatively small radius.

By the use of chains around the pulleys, pulleys of small diameter may be used. When cables are used, the pulley must be relatively larger because the cables will fail when trained around a small radius. The use of chains, is therefore, important because it reduces the distance between axles.

Bumper or stop discs 87 are provided on the free ends of the beams, that is, on the rear ends of beams 108, the front and rear ends of beams 128, and the front ends of beams 160. The members 120 and 144 serve the same purpose as members 89 and are of such area that the discs 87 abut or rub against their respective members 120 and 144 when the beams tend to deflect laterally inwardly.

In the embodiment of the invention here described, receptacles 180 in the form of bins are mounted on the vehicle frame 16 and have bottom outlets 182 adapted to be closed by pivoted doors 184. The present construction is particularly adapted for handling solid material such as sand and gravel, but it is to be understood that the receptacle 180 could be replaced with other types of containing means, such as tanks.

In Figs. 11 and 12, a modified form of slide construction is illustrated in that instead of providing the bearing plate 99 between slide plate 94 and bearing member 96, rollers are provided. Such rollers are illustrated at 190 and are longitudinally tapered. Any suitable number of such rollers may be employed at suitable spaces across the slide plate. The ends of the rollers are journalled in bearing brackets 192 which may be fixed to bearing plate 96. The longitudinal axis of the rollers also preferably lie on radii struck from the pivot center of the radius members, such as the radius member 66.

In Fig. 13, a modified form of shackle construction is illustrated for mounting the ends of the beams or leaf springs to the vehicle frame or steering frame. In the embodiment shown in Fig. 13, the shackle is illustrated as replacing shackle 72 associated with beams 64. The ends of beams 64 are pivotally connected to the upper ends of a shackle 196 having the lower end thereof universally connected to a mounting bracket 198 through a ball and socket connection 199. With this construction, a limited lateral movement is permitted for the shackle as well as the longitudinal movement which permits relatively free movement of the axle.

Formal changes may be made in the specific embodiment of the invention described without departing from the spirit of the invention, the scope of which is commensurate with the appended claims.

What is claimed is:

1. In combination, a vehicle frame, a plurality of tandem axles disposed under said frame and spaced therealong, a steering frame pivotally mounted on said vehicle frame adjacent the forward end thereof, means connecting the forwardmost of said axles to said steering frame for pivotal movement therewith, suspension means at each side of said vehicle frame for supporting said vehicle frame on another axle adjacent said forwardmost axle, said suspension means being so constructed and arranged that said another axle is free within limits to bodily swing laterally about a point exterior of the axle, in such a manner that the transverse midpoint of the axle moves toward one side or the other of the vehicle frame; and to tilt relative to said vehicle frame and to said forwardmost axle.

2. In combination, a vehicle frame, a plurality of tandem axles disposed under said frame and spaced therealong, a pivot frame pivotally mounted on said vehicle frame adjacent the forward end thereof, means connecting the forwardmost of said axles to said pivot frame for pivotal movement therewith, suspension means at each side of said vehicle frame for supporting said vehicle frame on another axle adjacent said forwardmost axle, said suspension means including common suspension means mounted on said pivot frame and connected to said forwardmost axle and to said another axle, said suspension means being so constructed and arranged that said another axle is free within limits to bodily swing laterally about a point exterior of the axle, in such a manner that the transverse midpoint of the axles moves toward one side or the other of the vehicle frame; and to tilt relative to said vehicle frame and to said forwardmost axle, and a longitudinally extending radius member connected to said another axle and connected to said vehicle frame rearwardly of said forwardmost axle.

3. In combination, a vehicle frame, a plurality of tandem axles disposed under said frame and spaced therealong, a steering frame pivotally mounted on said vehicle frame adjacent the forward end thereof, means connecting one of said axles to said steering frame for pivotal movement therewith, suspension means at each side of said vehicle frame for supporting said vehicle frame on another axle adjacent said one of said axles, said suspension means including common suspension means mounted on said steering frame and connected to said one of said axles and to said another axle, said suspension means being so constructed and arranged that said another axle is free within limits to bodily swing laterally about a point exterior of the axle, in such a manner that the transverse midpoint of the axle moves toward one side or the other of the vehicle frame; and to tilt relative to said vehicle frame and to said one of said axles, a depending bracket connected to said vehicle frame and extending downwardly behind said one of said axles, and a longitudinally extending radius member having its forward end pivotally connected to said bracket and its rear end connected to said another axle.

4. In combination, a vehicle frame, a plurality of tandem axles disposed under said frame and spaced therealong, a steering frame pivotally connected to said vehicle frame adjacent the forward end thereof, means connecting one of said axles to said steering frame for pivotal movement therewith, said connecting means including longitudinally extending beams at each side of said steering frame, each of said beams being connected intermediate its ends to said one of said axles and each having its forward end connected to said steering frame, suspension means at each side of said vehicle frame for supporting said vehicle frame on another axle adjacent said one of said axles, said suspension means including longitudinally extending beams connected to said another axle intermediate the ends of said beams, means connecting the rear ends of said last-named beams to said vehicle frame for sliding movement relative thereto, and flexible means connecting the forward ends of said last-named beams to the rear ends of said first-named beams, the construction being such that said another axle is free to swing laterally and tilt relative to said vehicle frame and to said one of said axles.

5. In combination, a vehicle frame, a plurality of tandem axles disposed under said frame and spaced therealong, a steering frame pivotally connected to said vehicle frame adjacent the forward end thereof, means connecting the forwardmost of said axles to said steering frame for pivotal movement therewith, said connecting means including longitudinally extending beams at each side of said steering frame, each of said beams being connected intermediate its ends to said forwardmost axle and each having its forward end connected to said steering frame, suspension means at each side of said vehicle frame for supporting said vehicle frame on another axle adjacent said one of said axles, said suspension means including longitudinally extending beams connected to said another axle intermediate the ends of said beams, means connecting the rear ends of said last-named beams to said vehicle frame for transverse sliding movement relative thereto, flexible means connecting the forward ends of said last-named beams to the rear ends of said first-named beams, and a longitudinally extending radius member having its forward end universally connected to said vehicle frame rearwardly of said forwardmost axle and having its rear end connected to said another axle, the construction being such that said another axle is free to swing laterally and tilt relative to said vehicle frame and to said forwardmost axle.

6. In combination, a vehicle frame, a plurality of tandem axles disposed under said frame and spaced therealong, a steering frame pivotally connected to said vehicle frame adjacent the forward end thereof, means connecting the forwardmost of said axles to said steering frame for pivotal movement therewith, said connecting means including longitudinally extending beams at each side of said steering frame, each of said beams being connected intermediate its ends to said forwardmost axle and each having its forward end connected to said steering frame, suspension means at each side of said vehicle frame for supporting said vehicle frame on another axle adjacent said forwardmost axle, said suspension means including longitudinally extending beams connected to said another axle intermediate the ends of said beams, a transversely extending slide plate slidably mounted on said vehicle frame rearwardly of said another axle, means connecting the rear ends of said last-named beams to said slide plate for transverse sliding movement relative to said vehicle frame, and flexible means connecting the forward ends of said last-named beams to the rear ends of said first-named beams, and a longitudinally extending radius member having its forward end universally mounted to said vehicle frame rearwardly of said forwardmost axle and having its rear end connected to said another axle, the construction being such that said another axle is free to swing laterally and tilt relative to said vehicle frame and to said forwardmost axle.

7. In combination, a vehicle frame, a plurality of tandem axles disposed under said frame and spaced therealong, a steering frame pivotally connected to said vehicle frame adjacent the forward end thereof, means connecting the forwardmost of said axles to said steering frame for pivotal movement therewith, said connecting means including longitudinally extending beams at each side of said steering frame, each of said beams being connected intermediate its ends to said forwardmost axle and each having its forward end connected to said steering frame, suspension means at each side of said vehicle frame for supporting said vehicle frame on another axle adjacent said forwardmost axle, said suspension means including longitudinally extending beams connected to said another axle intermediate the ends of said beams, a member slidably mounted to said vehicle frame rearwardly of said another axle for transverse sliding movement relative to said vehicle frame, means connecting the rear ends of said last-named means to said member for transverse sliding movement relative to said vehicle frame, mounting members adjacent each side of said steering frame having pulleys mounted thereon, and a flexible member trained about each pulley connected to the rear end of each of said first-named beams at each side of said vehicle frame and connected to the forward ends of said last-named beams at each side of said vehicle frame.

8. In combination, a vehicle frame, a plurality of tandem axles disposed under said frame and spaced therealong, a steering frame pivotally mounted on said vehicle frame adjacent the forward end thereof, means connecting the forwardmost of said axles to said steering frame for pivotal movement therewith, suspension means at each side of said frame for supporting said frame on another axle adjacent said one of said axles, said suspension means being so constructed and arranged that said another axle is free within limits to bodily swing laterally about a point exterior of the axle, in such a manner that the transverse midpoint of the axle moves toward one side or the other of the vehicle frame; and to tilt relative to said vehicle frame and to said forwardmost axle, and suspension means at each side of said vehicle frame for supporting said vehicle frame on a plurality of other axles disposed rearwardly of said another axle, said last named suspension means being so constructed and arranged that certain of said other axles are free to swing laterally and tilt relative to said vehicle frame.

9. In combination, a vehicle frame, a plurality of tandem axles disposed under said frame and spaced at substantially equal spaces therealong, a steering frame pivotally connected to said vehicle frame adjacent the forward end thereof, means connecting one of said axles to said steering frame for pivotal movement therewith, said connecting means including longitudinally extending beams at each side of said steering frame, each of said beams being connected intermediate its ends to said one of said axles and each having its forward end connected to said steering frame, suspension means at each side of said vehicle frame for supporting the vehicle frame on another axle adjacent said one of said axles, said suspension means including longitudinally extending beams connected to said another axle intermediate the ends of said beams, means connecting the rear ends of said last named beams to said vehicle frame for transverse sliding movement relative thereto, flexible means connecting the forward ends of said last named beams to the rear ends of said first named beams, the construction being such that said another axle is free to swing laterally and tilt relative to said vehicle frame and to said one of said axles, the remainder of said axles being disposed rearwardly of said another axle, suspension means at each side of said vehicle frame for supporting said vehicle frame on each of said remaining axles, said suspension means including longitudinally extending beams individual to each of said remaining axles connected to each of said remaining axles intermediate the ends of said beams, means fixing the beams of one of said remaining axles against pivotal movement relative to said vehicle frame, and means mounting the beams of the other of said remaining axles for swinging laterally and tilting movement relative to said vehicle frame.

10. In combination, a vehicle frame, a plurality of tandem axles disposed under said frame and spaced therealong, said plurality of axles including a group of three axles, suspension means at each side of said vehicle frame for supporting said vehicle frame on said axles, said suspension means being so constructed and arranged that one of the axles of said group is fixed against pivotal movement relative to said frame and the others of said axles are free within limits to bodily transversely swing about a point exterior of the axle, in such a manner that the transverse midpoint of the axle moves toward one side or the other of the vehicle frame; and to tilt relative to said frame and to each other and each of said group of three axles being provided with a radius rod connected thereto and universally connected to said vehicle frame.

11. In combination, a vehicle frame, a plurality of tandem axles disposed under said frame and spaced at substantially equal spaces therealong, said plurality of axles including a first axle, a second axle, a third axle, a fourth axle and a fifth axle, a steering frame pivotally mounted on said vehicle frame adjacent the forward end thereof, means connecting said first axle to said steering frame for pivotal movement therewith, suspension means at each side of said vehicle frame for supporting said vehicle frame on the remaining axles, said suspension means including a beam member on each side of said frame connected intermediate its ends to said second axle, a beam member at each side of said frame connected intermediate its ends to said third axle, a beam member at each side of said frame connected intermediate its ends to said fourth axle, a beam member at each side of said frame connected intermediate its ends to said fifth axle, means connecting the rear ends of the beams on said second axle to the vehicle frame for sliding movement relative thereto, and flexible means connecting the forward ends of said last-named beams to the rear ends of the beams on said first axle, means connecting the forward ends of the beams on said third axle to said vehicle frame, means connecting the rear ends of the beams on said fifth axle to said vehicle frame, depending mounting members between said third and fourth axles on each side of the vehicle frame, each of said members having a pulley mounted thereon, a flexible member trained around each of the pulleys between said third and fourth axles, said flexible members being connected to the adjacent ends of the beams on said third and fourth axles, a slide plate slidably mounted to said vehicle frame between said fourth and fifth axles, depending mounting members mounted on said slide plate on each side of the vehicle frame, each of said last-named mounting members having a pulley mounted thereon, other flexible members trained over said last-named pulleys between said fourth and fifth axles, said other flexible members being connected to the adjacent ends of the beams on said fourth and fifth axles.

12. In combination, a vehicle frame, a plurality of tandem axles disposed under said frame and spaced therealong, a steering frame pivotally mounted on said vehicle frame, means connecting one of said axles to said steering frame for pivotal movement therewith, said connecting means including longitudinally extending beams at each side of said steering frame, each of said beams being connected intermediate its ends to said one of said axles and each having its forward end connected to said steering frame, flexible means connecting the rearward ends to said vehicle frame, rub plates mounted on said steering frame, and stop discs mounted on said rearward ends of said longitudinally extending beams, said combination being so constructed and arranged that the lateral movement of said rearward ends of said beams relative to said steering frame is limited by the contact of said stop disc with said rub plate.

13. In combination, a vehicle frame, a plurality of tandem axles disposed under said frame and spaced therealong, suspension means at each side of said vehicle frame for supporting said vehicle frame on one of said axles, said suspension means including longitudinally extending beams, each of said beams being connected to said one of said axles intermediate the ends of said beams, certain of the ends of said beams being connected to said vehicle frame, stop discs secured to said certain of the ends of said beams, and rub plates mounted on said vehicle frame adapted to engage said stop discs to limit the lateral movement of said certain of said ends of said beams relative to said vehicle frame.

MAURICE A. MILLS.

CERTIFICATE OF CORRECTION.

Patent No. 2,269,728. January 13, 1942.

MAURICE A. MILLS.

It is hereby certified that error appears in the printed specification of the above numbered patent requiring correction as follows: Page 5, first column, line 61, claim 5, after "its" insert --rear--; and second column, line 68, claim 8, strike out the semicolon after the word "frame"; and that the said Letters Patent should be read with this correction therein that the same may conform to the record of the case in the Patent Office.

Signed and sealed this 3rd day of March, A. D. 1942.

(Seal)

Henry Van Arsdale,
Acting Commissioner of Patents.